(12) United States Patent
Lee et al.

(10) Patent No.: US 9,096,316 B2
(45) Date of Patent: Aug. 4, 2015

(54) OPTIMIZED CORE FOR A STRUCTURAL ASSEMBLY

(75) Inventors: Wei-Yueh Lee, Arlington, TX (US); Paul Oldroyd, Azle, TX (US)

(73) Assignee: Textron Innovations Inc., Providence, RI (US)

( * ) Notice: Subject to any disclaimer, the term of this patent is extended or adjusted under 35 U.S.C. 154(b) by 654 days.

(21) Appl. No.: 13/363,794

(22) Filed: Feb. 1, 2012

(65) Prior Publication Data

US 2013/0195672 A1 Aug. 1, 2013

(51) Int. Cl.
*B64C 27/46* (2006.01)
*B64C 27/473* (2006.01)
*B32B 3/12* (2006.01)

(52) U.S. Cl.
CPC ............... *B64C 27/473* (2013.01); *B32B 3/12* (2013.01); *Y02E 10/721* (2013.01); *Y10T 428/24149* (2015.01)

(58) Field of Classification Search
CPC ...... F05D 2250/28; B64C 27/473; B32B 3/12
USPC ...................................... 416/229 R
See application file for complete search history.

(56) References Cited

U.S. PATENT DOCUMENTS

| 3,096,053 A * | 7/1963 | Pajak ........................... 244/133 |
| 3,205,109 A * | 9/1965 | Schudel ........................ 156/197 |
| 2,734,586 A * | 5/1973 | Wright et al. .................. 416/226 |
| 4,136,846 A | 1/1979 | Brault |
| 7,575,650 B1 * | 8/2009 | Shah et al. ...................... 156/78 |
| 7,857,596 B2 * | 12/2010 | Rakutt et al. ............... 416/229 R |

FOREIGN PATENT DOCUMENTS

| GB | 832773 A | 4/1960 | |
| GB | 919776 A | 2/1963 | |
| GB | 2249592 A * | 5/1992 | ............. B64C 11/20 |
| GB | 2252075 A | 7/1992 | |

OTHER PUBLICATIONS

European Examination Report in related European Application No. 12157128.5, mailed Apr. 19, 2013, 7 pages.
Canadian Office Action in related Canadian patent application No. 2,803,434, 3 pages, mailed Feb. 27, 2014.
Extended European Search Report from the European Patent Office in related European Patent Application No. 12157128.5, mailed Aug. 21, 2012, 7 pages.

* cited by examiner

*Primary Examiner* — Dwayne J White
*Assistant Examiner* — Jason Fountain
(74) *Attorney, Agent, or Firm* — James E. Walton; Brian E. Harris

(57) ABSTRACT

The present application relates a core member for a core-stiffened structural assembly. The core member includes a plurality of cell members oriented a direction to provide a tailored stiffness in a certain direction. The core member can further include one or more planar members that can aid in shear transfer between cell members. The cell members can be made from bonding a plurality of corrugated layers together. The core-stiffened structure can be a rotor blade for an aircraft. In such an embodiment, the torsional stiffness of the rotor blade can be tailored in at least one of the chordwise and spanwise directions to provide tailor a torsional stiffness at any give location in the rotor blade.

7 Claims, 8 Drawing Sheets

OPTIMIZED CORE FOR A STRUCTURAL ASSEMBLY

BACKGROUND

1. Technical Field

The present application relates in general to a core member for a structural assembly.

2. Description of Related Art

Composite structures, such as composite sandwich structures, are often used because of their high strength-to-weight ratio. Such structures are frequently used in the manufacture of aircraft, such as airplanes, helicopters, and the like. Composite sandwich structures typically include an upper skin, a lower skin, and a core adhesively bonded between the upper skin and the lower skin. The upper and lower skins can be made of a composite material, such as carbon, graphite, glass fibers, or the like disposed in a polymeric matrix, such as epoxy, polyetheretherketone, or the like. The core often comprises a honeycomb structure made from resin-infused fiber.

The use of conventional sandwich structures, however, is limited in some applications because the core of the sandwich structure fails to provide substantive mechanical strength in some configurations. For example, conventional core includes cell members which are normal to the skin members. Such a configuration can be less than ideal because the cell direction does not always provide the desired strength and stiffness in the loading directions. In other words, there is a need for a core member that can be optimized for directional strength and stiffness.

There are many cores well known in the art for use in composite sandwich structures; however, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
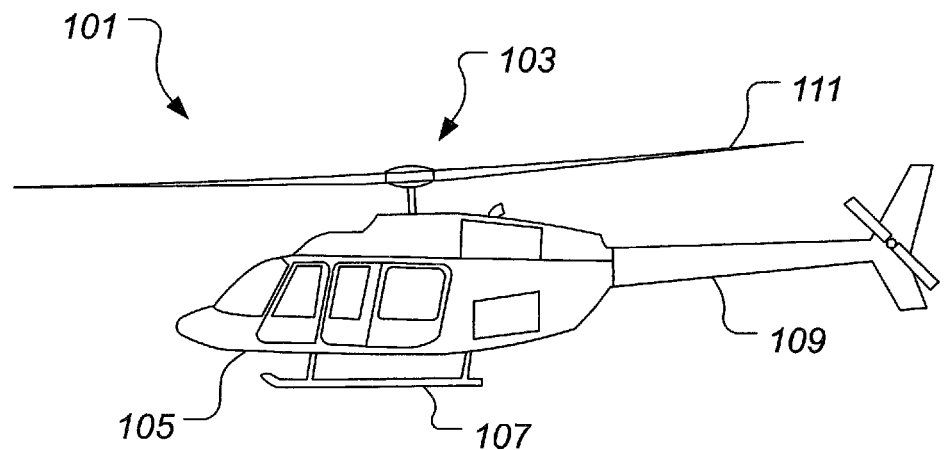
FIG. 1 is a side view of a rotorcraft, according to an embodiment of the present application.

Referring to FIG. 1 in the drawings, a rotorcraft 101 is illustrated. Rotorcraft 101 has a rotor system 103 with a plurality of rotor blades 111. The pitch of each rotor blade 111 can be selectively controlled in order to selectively control direction, thrust, and lift of rotorcraft 101. Rotorcraft 101 further includes a fuselage 105, landing gear 107, and a tail member 109.

Figure 2:
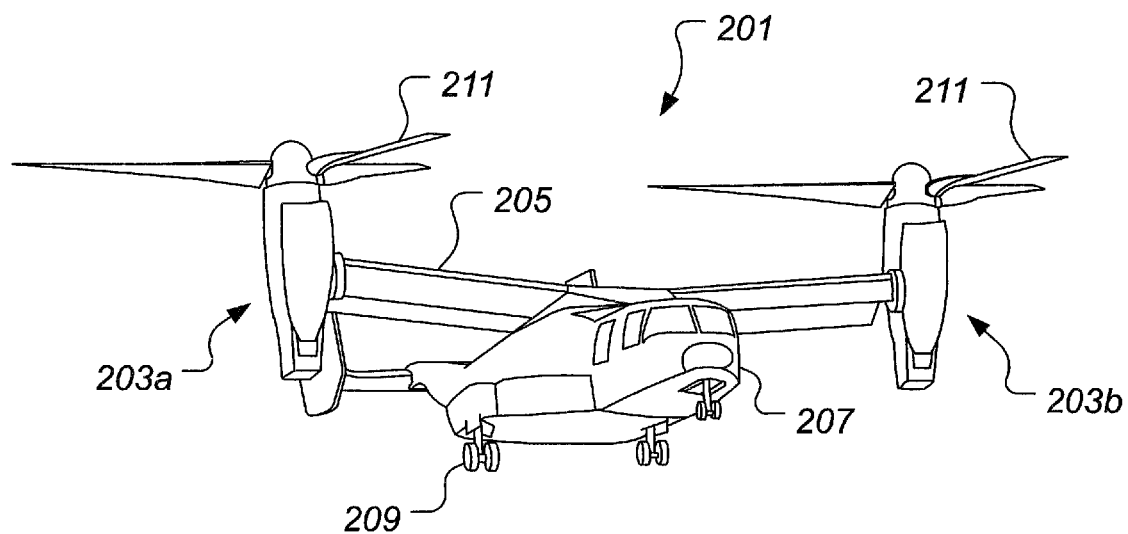
FIG. 2 is a perspective view of a tilt rotor aircraft, according to an embodiment of the present application.
Figure 3:
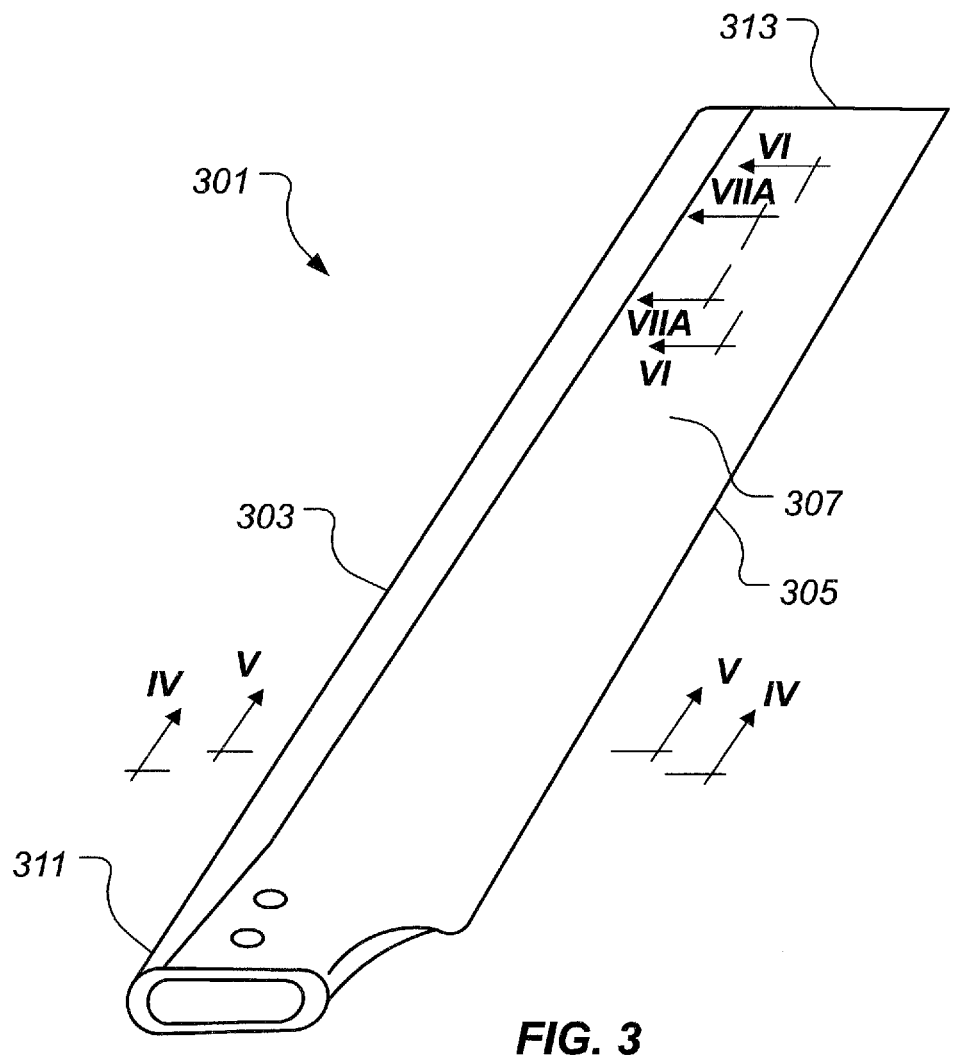
FIG. 3 is a perspective view of a rotor blade, according to an embodiment of the present application.
Figure 4:
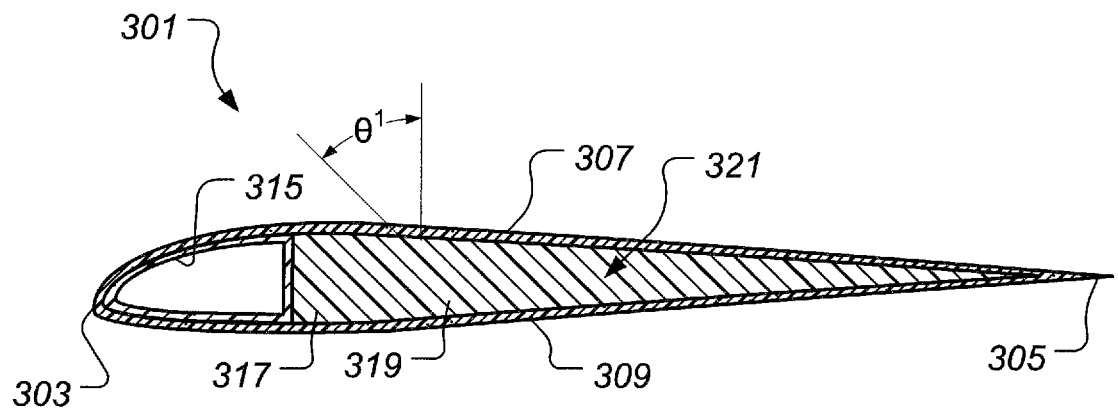
FIG. 4 is a cross-sectional view of the rotor blade, taken from section lines IV-IV in FIG. 3, according to an embodiment of the present application.
Figure 5:
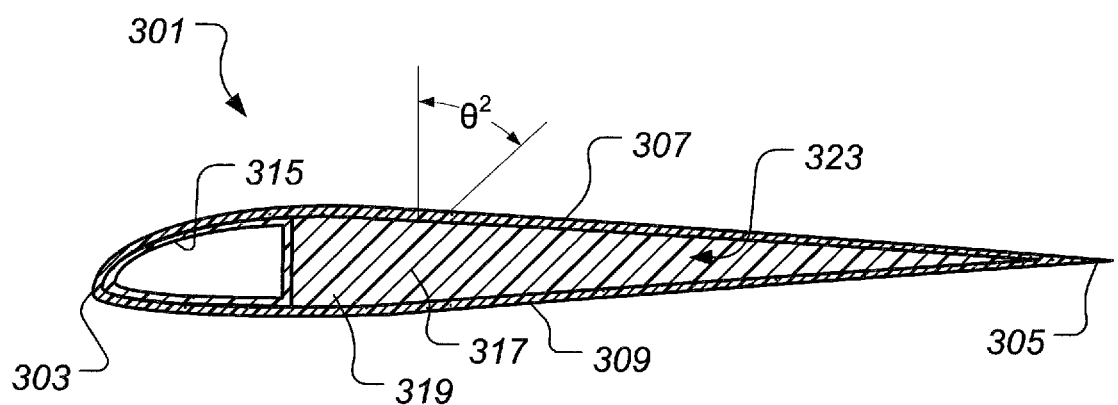
FIG. 5 is a cross-sectional view of the rotor blade, taken from section lines V-V in FIG. 3, according to an embodiment of the present application.

Referring to Fig. 2 in the drawings, a tiltrotor aircraft 201 is illustrated. Tiltrotor aircraft 201 includes a fuselage 207, a landing gear 209, a wing 205, and rotatable nacelles 203a and 203b, Each nacelle 203a and 203b includes a plurality of rotor blades 211. The position of nacelles 203a and 203b, as well as the pitch of rotor blades 211, can be selectively controlled in order to selectively control direction, thrust, and lift of tiltrotor aircraft 201.

It is especially desirable for components of rotorcraft 101 and tiltrotor aircraft 201 to be manufactured with composite systems since composite components are typically very weight efficient. Illustrative composite components can include: wings, blades, fuselage panels, compartments, flooring, to name a few. As such, the embodiments of the present application may be utilized to manufacture composite components for rotorcraft 101 and tiltrotor aircraft 201, as well as other aircraft.

There is a need for an improved core for use in sandwich structures. Further, there is a need for an improved core that can be directionally optimized for the predicted loading of the structure. Therefore, it is an object of the present application to provide an improved core for use in sandwich structures. This and other objects are achieved by a core, which includes a plurality of cell members with selected cell members being oriented at an angle. The improved core and sandwich structure are described herein as composite materials; however, it should be appreciated that the improved core and sandwich structure can be made of materials other than composite, such as metal, paper, plastic, wood, and hybrid materials, to name a few examples.

Referring to FIGS. 3-7B, a rotor blade 301 is illustrated. A leading edge 303 defines a forward contour of rotor blade 301. Upper skin 307 and lower skin 309 (shown in FIGS. 4-7A) define the upper and lower contours of rotor blade 301. Upper skin 307 and lower skin 309 preferably comprise a fiber-reinforced, resin composite material, such as a carbon fiber-reinforced epoxy material. Trailing edge 305 represents the trailing portion where upper skin 307 and lower skin 309 join. A root end 311 is the structural region where rotor blade 301 is coupled to the rotor hub of the rotorcraft. A tip end 313 represents the end portion of rotor blade 301. It should be appreciated that rotor blade 301 may have a variety of airfoil shapes, including articulated members such as moveable flaps, and the like.

Rotor blade 301 can include a spar 315 that traverses the spanwise length of rotor blade 301 from approximately near root end 311 to tip end 313. Spar 315 can be configured to provide a torsional strength and stiffness during operation of rotor blade 301. Rotor blade 301 further includes a core 317. Core 317 includes cell members 319 that are selectively oriented and arranged to provide an optimized strength and stiffness in certain loading conditions. For example, core 317 can include a plurality of alternating adjacent rows of cell members 319. The alternating rows of cell members 319 can be oriented in the spanwise direction, the chordwise direction, or a resultant combination of spanwise and chordwise directions. Core 317 can have a first row 321 of cell members 319 oriented at an angle $\theta^1$, while also having a second row 323 of cell members 319 oriented at an angle $\theta^2$. The first row 321 and second row 323 being repeated to form a pattern. In the illustrated embodiment, $\theta^1$ is approximately −45° while $\theta^2$ is approximately 45°. However, it should be appreciated that $\theta^1$ and $\theta^2$ may be other angles. For example $\theta^1$ can be approximately −30° while $\theta^2$ is approximately 30°. Furthermore, first row 321 and second row of cell members 319 $\theta^1$ and $\theta^2$ can be nonsymmetrical. For example, $\theta^1$ can be approximately −45° while $\theta^2$ is approximately 15°. It should also be appreciated that in some embodiments, either $\theta^1$ or $\theta^2$ can have a zero angle.

Figure 6:
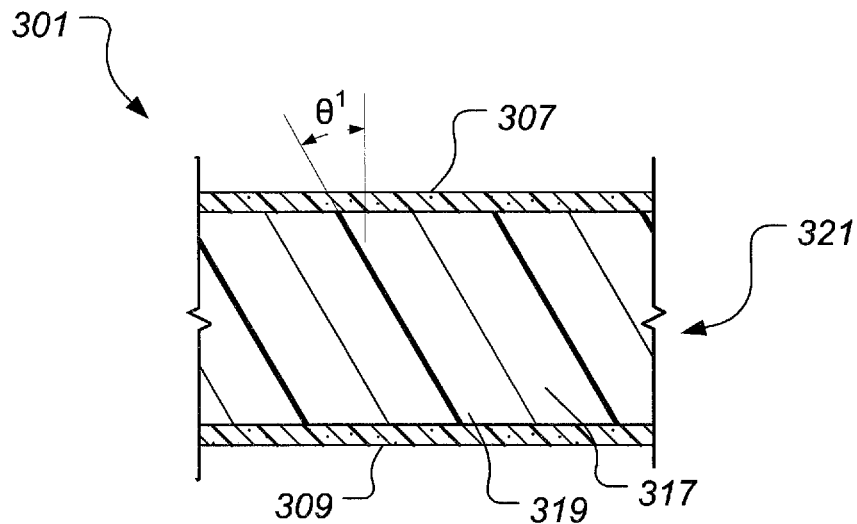
FIG. 6 is a cross-sectional view of the rotor blade, taken from section lines VI-VI in FIG. 3, according to an embodiment of the present application.
Figure 7A:
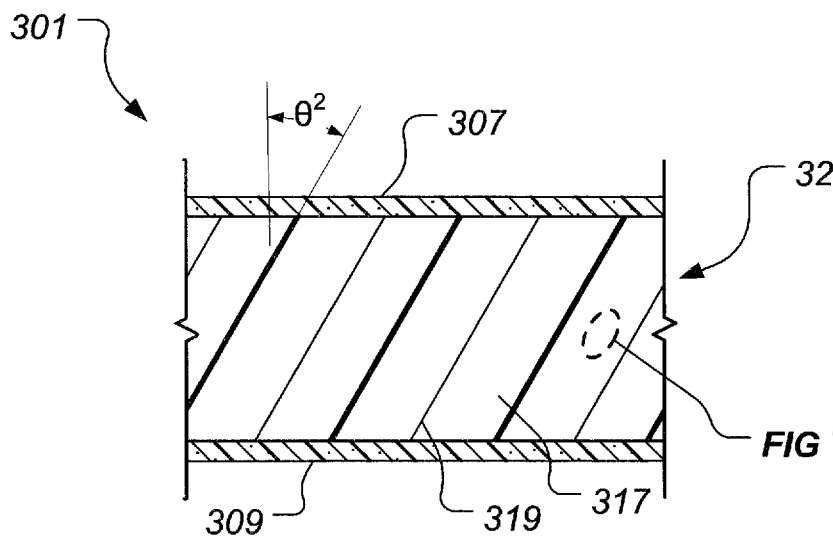
FIG. 7A is a cross-sectional view of the rotor blade, taken from section lines VIIA-VIIA in FIG. 3, according to an embodiment of the present application.

Referring in particular to FIGS. 6 and 7A, core 317 can be oriented and arranged in rotor blade 301 such that first row 321 and second row 323 alternate in a chordwise direction.

Core 317 can be optimized for a specific structural implementation by selectively orienting the rows of cell members 319 at certain angles $\theta^1$ and $\theta^2$. In rotor blade 301, the torsional strength and stiffness can be specifically tailored along the chordwise and spanwise directions by tailoring angles $\theta^1$ and $\theta^2$. For example, the torsional strength and stiffness can be selectively tailored along the spanwise direction by orienting angles $\theta^1$ and $\theta^2$ of cell members 319. It can be desirable to have a high torsional strength and stiffness near root end 311, therefore, angles $\theta^1$ and $\theta^2$ near root end 311 can be −45° and 45° to provide maximum torsional strength and stiffness. However, it may be desirable to have a lesser amount of torsional strength and stiffness near tip end 313, therefore, angles $\theta^1$ and $\theta^2$ near root end 311 can be −15° and 15° to provide a lesser amount of torsional strength and stiffness. By selectively tailoring angles $\theta^1$ and $\theta^2$ in both the spanwise and chordwise directions, the operational strength and stiffness can be tailored for mass-balancing and dynamic tuning. Further, by increasing the torsional strength of core 317, the torsional load carrying responsibility of spar 315 can be decreased. In such a scenario, spar 315 can be decreased in weight and size. Alternatively, the torsional load carrying capability of core 317 can be treated as a redundancy to the torsional load carrying of spar 315. In such a scenario, the factor of safety of the rotor blade 301 can be increased by the torsional load carrying capability of core 317.

Figure 7B:
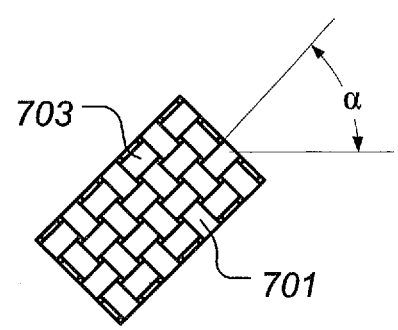
FIG. 7B is a detail view of the material in the core member used in the rotor blade, taken at detail line VIIB-VIIB in FIG. 3, according to an embodiment of the present application.
Figure 8:
FIG. 8 is a front view of a panel, according to an embodiment of the present application.
Figure 9:
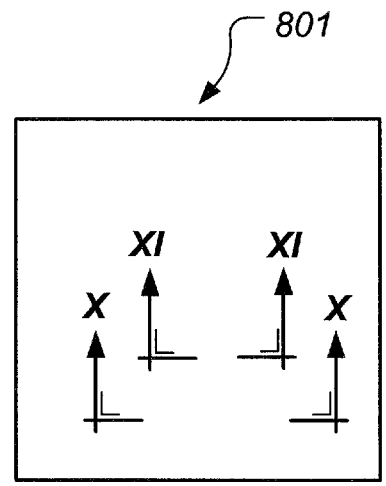
FIG. 9 is a top view of the panel of FIG. 8, according to an embodiment of the present application.
Figure 10:
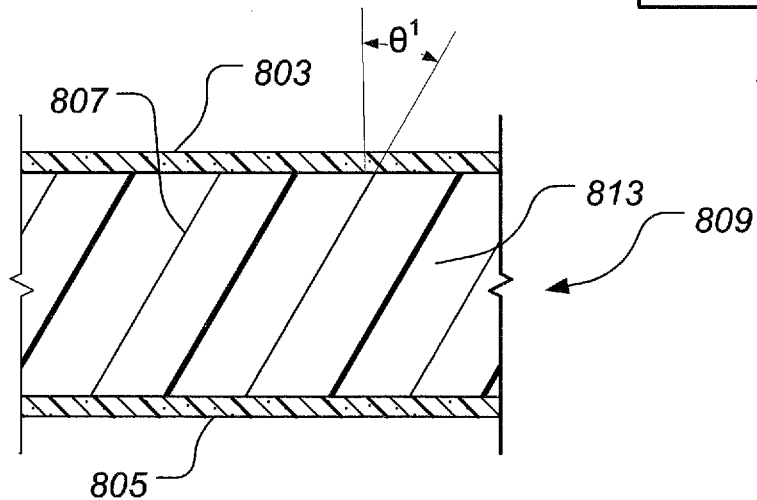
FIG. 10 is a cross-sectional view of the panel, taken from section lines X-X in FIG. 9, according to an embodiment of the present application.
Figure 11:
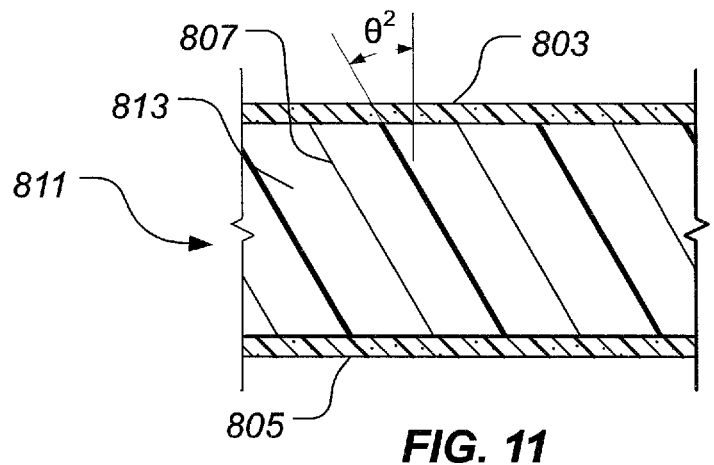
FIG. 11 is a cross-sectional view of the panel, taken from section lines XI-XI in FIG. 9, according to an embodiment of the present application.
Figure 12:
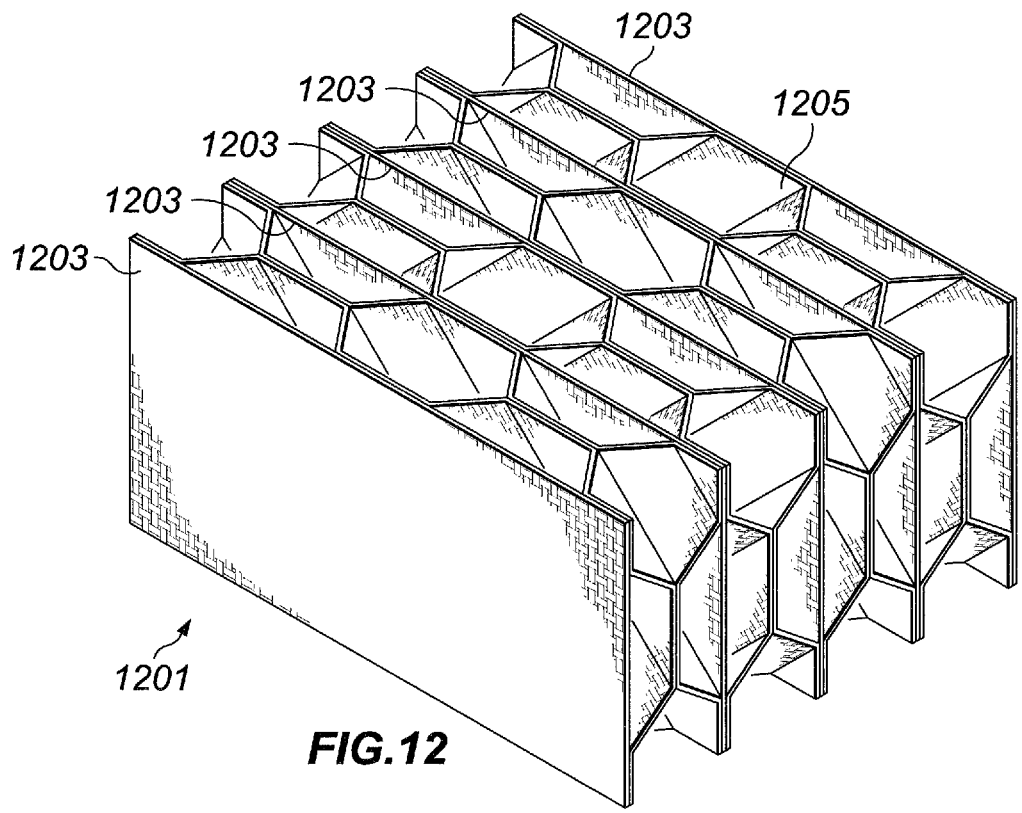
FIG. 12 is a perspective view of a core, according to an embodiment of the present application.
Figure 13:
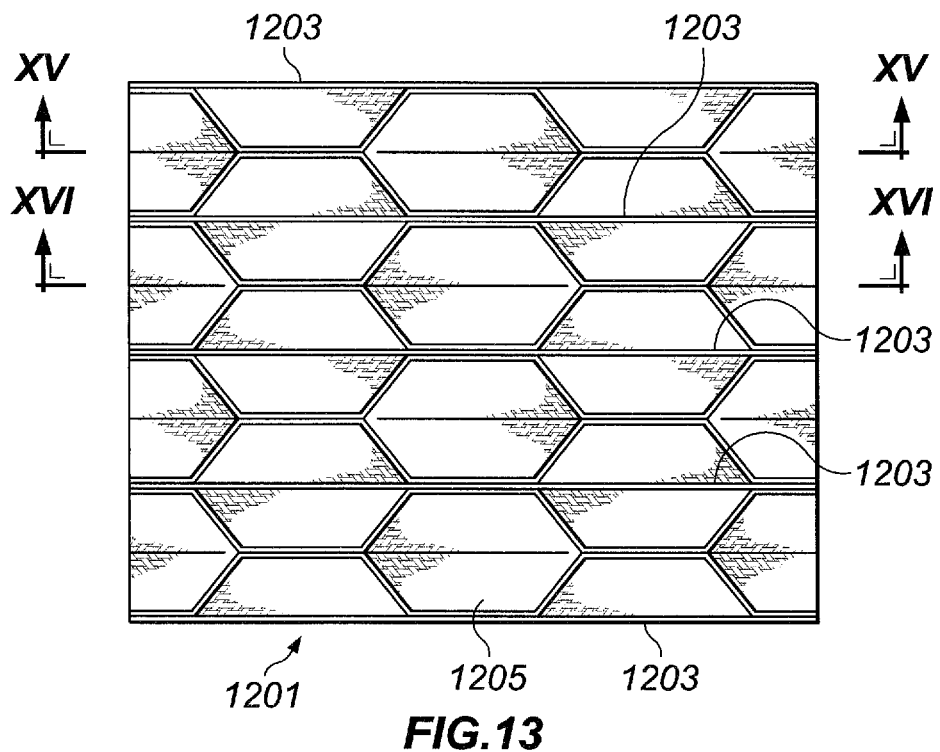
FIG. 13 is a top view of the core of FIG. 12, according to an embodiment of the present application.
Figure 14:
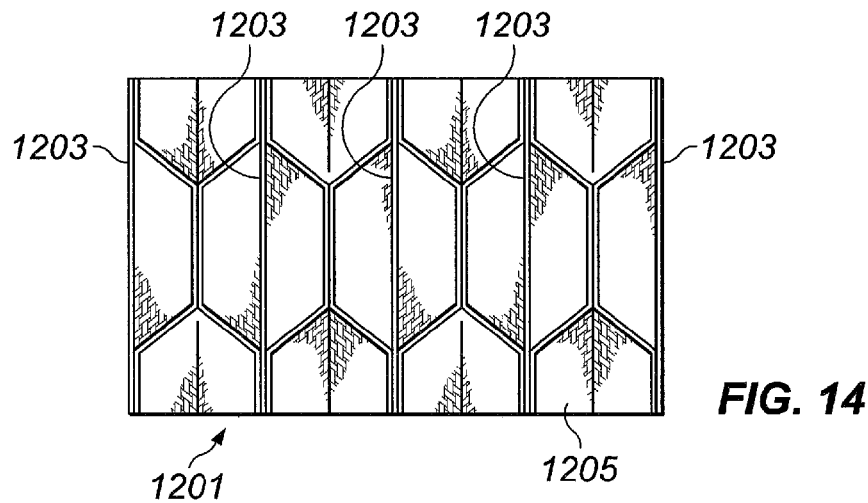
FIG. 14 is an end view of the core of FIG. 12, according to an embodiment of the present application.

FIG. 7B depicts one particular illustrative material configuration of a core, such as core 317. In the illustrated configuration, a plurality of fibers 701 (only one labeled for clarity) extending in a first direction α and a plurality of fibers 703 (only one labeled for clarity) extending in a second direction α are woven about one another. The direction α of fibers 701 can be +45°, while the direction α of fibers 703 can be −45°. It should be appreciated that the fiber direction α of fibers 701 and 703 can be tailored to provide material directional stiffness as desired. Furthermore, the system of the present application can tailor strength and stiffness of a composite article, such as rotor blade 301 or panel 801, by not only selectively orienting the angles of cell members 319, but also by selectively orienting material fiber direction, such as direction α of plurality of fibers 701 and 703. It should further be appreciated that even though the material composition of core 317 is illustrated as a multidirectional woven fiber core, the system of the present application is not so limited. Rather, core 317 can be composed of any variety of materials in a variety of material fiber or grain orientations.

Referring to FIGS. 8-12, a panel 801 is illustrated. Panel 801 is illustrative of core stiffened composite panel 801 that can be used in a variety of implementations on an aircraft, such as rotorcraft 101 or tiltrotor aircraft 201. Panel 801 includes an upper face sheet 803 and a lower face sheet 805. A core 807 is bonded between upper face sheet 803 and lower face sheet 805. Core 807 is similar to core 317. Core 807 includes cell members 813 that are selectively oriented and arranged to provide an optimized strength and stiffness in certain loading conditions. For example, core 801 can include a plurality of alternating adjacent rows of cell members 813. Core 801 can have a first row 809 of cell members 813 oriented at an angle $\theta^1$, while also having a second row 811 of cell members 813 oriented at an angle $\theta^2$. Selectively orienting cell members 813 at angles $\theta^1$ and $\theta^2$ allows the directional stiffnesses in panel 801 to be directionally tailored. For example, it can be desirable for panel 801 to have a high stiffness in a first stiffness direction. In order to achieve the high stiffness in the stiffness direction, then the angle $\theta^1$ of cell members 813 can be oriented to axially align with the first stiffness direction. Conversely, if it is desirable for panel 801 to have a low stiffness in a second stiffness direction, then the angle $\theta^1$ of cell members 813 can be oriented such that a centerline axis of each cell member 813 is approximately perpendicular to the second stiffness direction.

Figure 15:
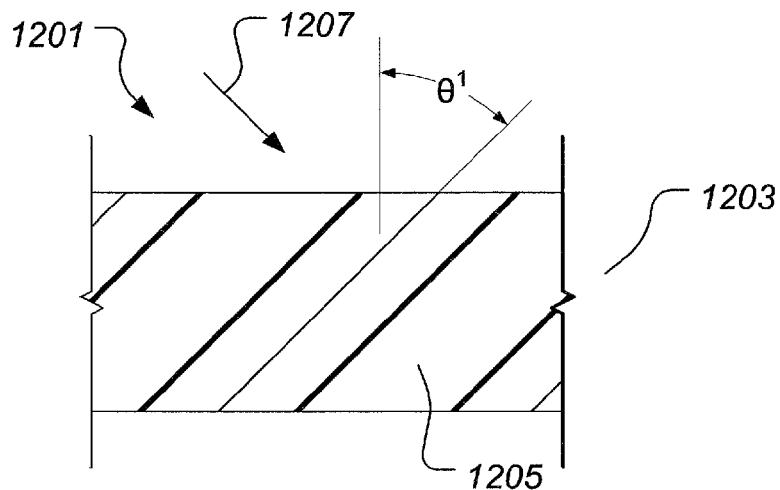
FIG. 15 is a cross-sectional view of the core, taken from section lines XV-XV in FIG. 13, according to an embodiment of the present application.
Figure 16:
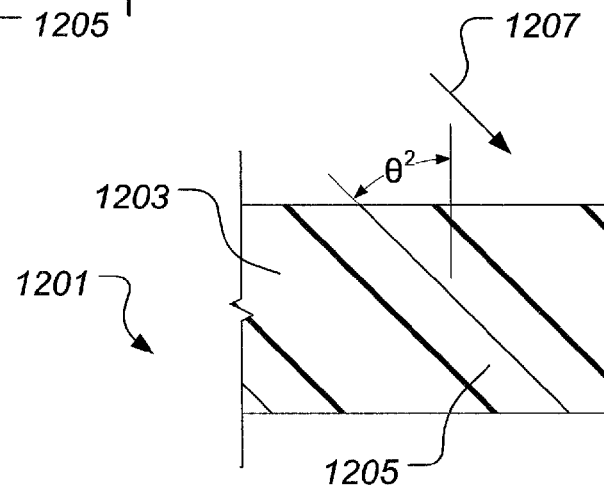
FIG. 16 is a cross-sectional view of the core, taken from section lines XVI-XVI in FIG. 13, according to an embodiment of the present application.

Referring to FIGS. 12-16, an exemplary core 1201 is illustrated. Core 1201 is substantially similar in form and function to core 317 and core 807; however, core 1201 further includes a plurality of planar member 1203 in addition to angled cell members 1205. In some embodiments it may be desirable to use core 1201 in rotor blade 301 and panel 801. Planar member 1203 can act as a shear member between adjacent rows of cell members 1205 so as to provide increased stability of core 1201. Referring in particular to FIGS. 15 and 16, a load in a direction 1207 would typically act to distort cell members 1205 oriented at angle $\theta^1$ while also inducing a shearing load at a common surface between adjacent rows of cell members 1205; however, planar member 1203 acts to increase the common surface area between adjacent row of cell members 1205 so as to transfer the loads, through shear, into the row of cell members 1205 oriented at angle $\theta^2$, which have strength and stiffness in load direction 1207. Such a configuration acts like a truss-shear web and increases the ability of core 1201 to resist shear loads in the plane of planar member 1203. Further, planar member 1203 can help prevent buckling of cell members 1205, while cell members 1205 can help prevent buckling of planar member 1203. Planar member 1203 can further provide directional load carrying capabilities. Even further, planar member 1203 can provide greater surface network area for bonding between upper and lower face sheets; as such, planar member 1203 can provide increased bond strength capabilities.

Figure 17:
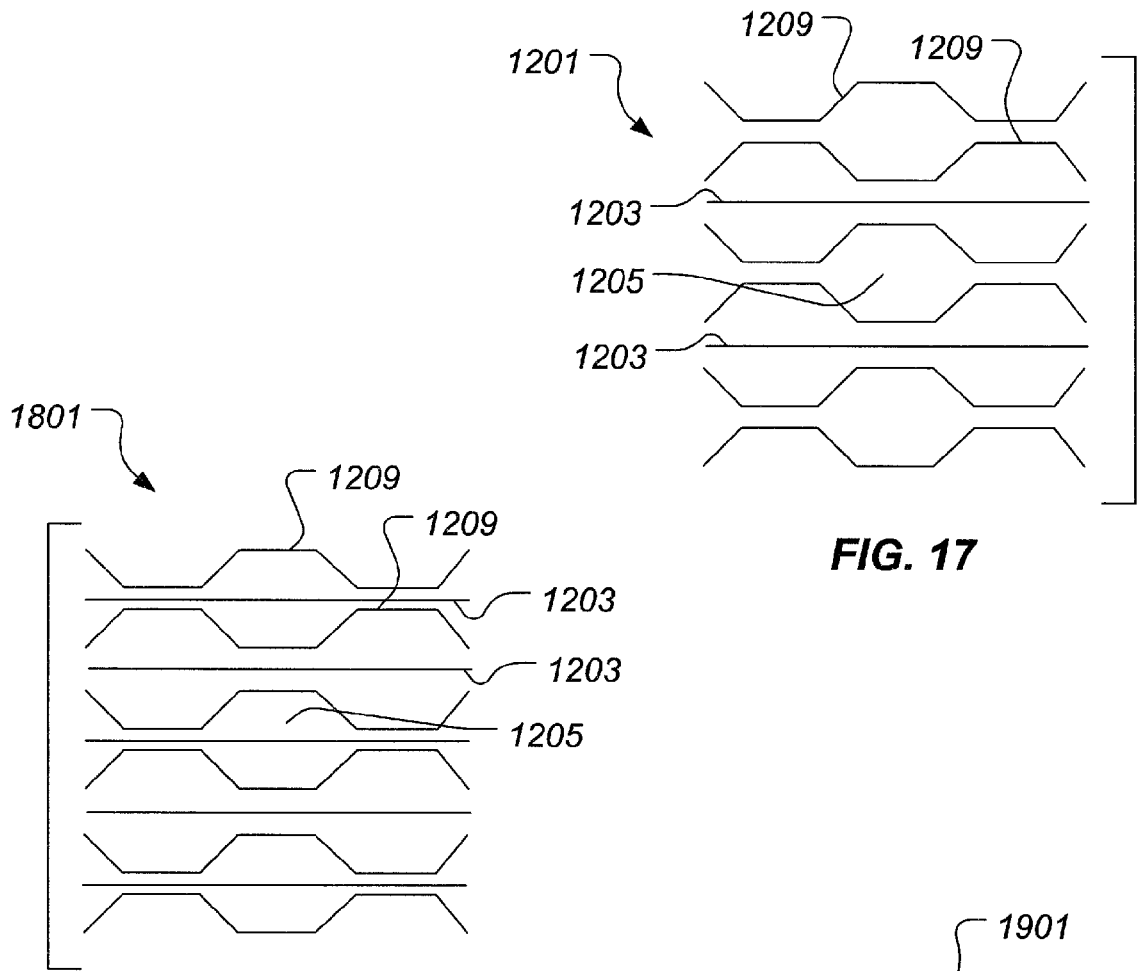
FIG. 17 is a schematic exploded view of a core, according to an embodiment of the present application.

Referring also to FIG. 17, an exploded schematic view of core 1201 is illustrated to more particularly describe the assembly and tailorization of core 1201. Core 1201 includes alternating symmetric corrugated layers 1209 which are bonded to form cell members 1205. Planar members 1203 can be selectively located between certain pairs of symmetric layers 1209. In the illustrated embodiment, layers 1209 are corrugated to form hexagonal shaped cell members 1205; however, it should be fully appreciated that layers 1209 maybe configured to form cell members 1205 of any variety of shapes. For example, cell members 1205 maybe oval shaped, circular shaped, or square shaped, to name a few examples. In an alternative embodiment, layers 1209 are non-symmetrical to form non-symmetric shapes of cell members 1205. In the illustrated embodiment, corrugated layers 1209 and planar layers 1203 can be bonded together with an adhesive layer.

Figure 18:
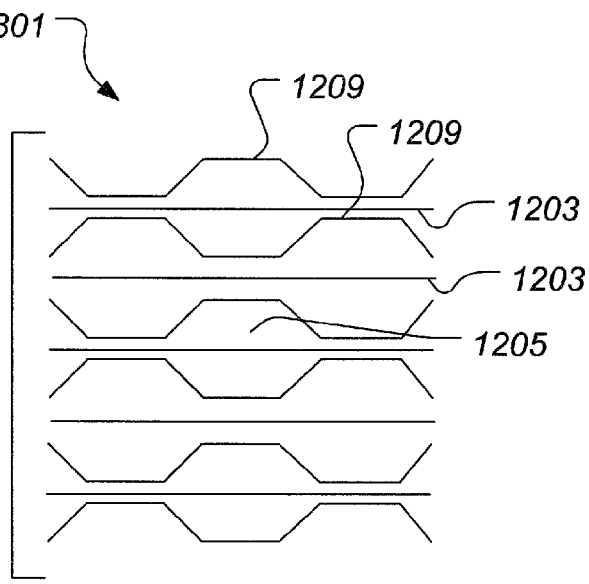
FIG. 18 is a schematic exploded view of a core, according to an embodiment of the present application.

Referring also to FIG. 18, an exploded schematic view of a core 1801 is illustrated. Core 1801 is substantially similar to core 1201, except for having additional planar member 1203 that traverses through an interior of each cell member 1205. Core 1801 is another illustrative embodiment of cores 1201, 807, and 317.

Figure 19:
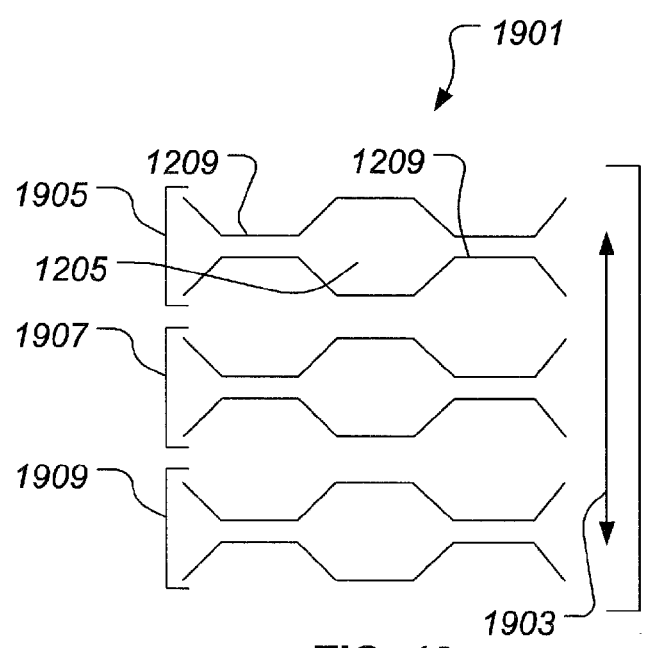
FIG. 19 is a schematic exploded view of a core, according to an embodiment of the present application.

Referring also to FIG. 19, core 1901 is substantial similar in form and function to core 317 and core 807; however, core 1901 includes pairs of corrugated layers 1209, each pair forming cell members at an angle $\theta$ so that the normal stiffness increases or decreases along direction 1903. For example, a pair 1905 forms cell members at an angle $\theta$ of approximately 45°, while pair 1907 forms cell members at an angle $\theta$ of approximately 40°, while pair 1909 forms cell members at an angle $\theta$ of approximately 35°, for example. Core 1901 is merely exemplary of a wide variety of embodiments that can formed by varying and tailoring the angle $\theta$ of cell members to tailor the various directional stiffnesses along a direction of the core.

The embodiments of the present application provide significant advantages, including: (1) providing an improved core that can be directionally optimized for the predicted loading of the composite structure; (2) providing a core that can have planar members for tailoring the core in one or more stiffness directions; and (3) providing a rotor blade having a core member that is variably optimized for torsional strength and stiffness along at least one of the spanwise and chordwise directions.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A core member for a structure, the core comprising:
   a plurality of rows of cell members, including:
   a first row of cell members, each cell in the first row of cell members being positioned at a first angle relative to a vertical direction;
   a second row of cell members adjacent to the first row of cell members, each cell in the second row of cell members being positioned at a second angle relative to a vertical direction, the second angle being symmetrical to the first angle;
   a third row of cell members separated from the second row of cell members by plural rows of cell members, each cell in the third row of cell members being positioned at a third angle relative to a vertical direction, the third angle being different from the first and second angles; and
   a fourth row of cell members, each cell in the fourth row of cell members being positioned at a fourth angle relative to a vertical direction, the fourth angle being symmetrical to the third angle.

2. The core member according to claim 1, further comprising:
   a planar member located between the first row and the second row.

3. The core member according to claim 1, further comprising:
   a planar member located through the first row and the second row.

4. The core member according to claim 1, wherein the second angle is greater than zero degrees.

5. The core member according to claim 1, wherein the cell members of the first and second rows are hexagonal shaped.

6. The core member according to claim 1, wherein the cell members of the first and second rows are circularly shaped.

7. The core member according to claim 1, wherein the cell members of the first and second rows are formed from corrugated layers bonded together.

\* \* \* \* \*